United States Patent [19]

Zundel

[11] 4,308,005
[45] Dec. 29, 1981

[54] THERMOFORMING MACHINE WITH CUTTING PRESS CONNECTED THEREAFTER

[75] Inventor: Werner Zundel, Lauffen, Fed. Rep. of Germany

[73] Assignee: Adolf Illig GmbH & Co., Heilbronn, Fed. Rep. of Germany

[21] Appl. No.: 188,094

[22] Filed: Sep. 17, 1980

[30] Foreign Application Priority Data

Sep. 17, 1979 [DE] Fed. Rep. of Germany ....... 2937542

[51] Int. Cl.³ .............................................. B29C 17/04
[52] U.S. Cl. ................................. 425/302.1; 425/388; 425/304
[58] Field of Search ................... 425/398, 403.1, 302.1, 425/388, 304, 387.1, 397

[56] References Cited

U.S. PATENT DOCUMENTS

| | | | |
|---|---|---|---|
| 3,240,851 | 3/1966 | Scalora | 425/302.1 X |
| 3,647,335 | 3/1972 | Brown | 425/302.1 X |
| 3,785,762 | 1/1974 | Butzko | 425/398 X |
| 4,009,981 | 3/1977 | Rosen | 425/388 |
| 4,105,736 | 8/1978 | Padovani | 425/302.1 X |

FOREIGN PATENT DOCUMENTS 1277226  6/1972  United Kingdom .

Primary Examiner—J. Howard Flint, Jr.
Attorney, Agent, or Firm—Spencer & Kaye

[57] ABSTRACT

An apparatus for the molding of thermoplastic synthetic resin sheet stock into articles and for punching these articles from the sheet length, including a thermoforming machine having a sheet conveyor with an intermittent drive, and a cutting press disposed immediately after the thermoforming machine and having a separate sheet conveyor for conveying the formed sheet material across the table of the cutting press. Each of the conveyors includes a sprocket conveyor chain guided for rotation on rotatably mounted sprocket wheels, and the conveyor of the cutting press is drivingly connected with the conveyor of the thermoforming machine in that the sprocket wheels at the mutually facing ends of the two conveyors are in operative connection with each other.

7 Claims, 7 Drawing Figures

THERMOFORMING MACHINE WITH CUTTING PRESS CONNECTED THEREAFTER

BACKGROUND OF THE INVENTION

The invention relates to a thermoforming machine with a cutting press disposed or linked thereafter for the molding of thermoplastic synthetic resin sheet stock into articles and for punching these articles from the sheet length. For this purpose, the thermoforming machine comprises a forming station, a heating unit, and an intermittent feed arrangement for the stock material, while the cutting press comprises a vertically movable top platen with the cutting die, a rigid table, and a likewise intermittent material feed arrangement.

The combination of a thermoforming machine with a cutting press connected thereafter is utilized in the series production of articles wherein, however, the series do not include excessively large numbers of pieces, i.e., wherein a tool performing both forming and cutting operations would be too expensive. This combination is furthermore advantageous in articles formed from a very thin sheet. The forming tools are relatively inexpensive, and economical strip steel dies can be used as the cutting dies.

Although it is known to use a common material feed arrangement for both the cutting press and the thermoforming machine, and thus in effect permanently connect these two units together as a single unit (see for example British Pat. No. 1,277,226, issued June 7, 1972), it is preferable, for various reasons, if the cutting press is associated with the thermoforming machine as a separate unit, i.e., has its own material feed arrangement. For example, by providing the cutting press and thermoforming machine as separate units, it is readily possible to dismount the cutting press and associate same with another machine, if this is necessary for manufacturing reasons; thus, it may be necessary, depending on the article being formed, to connect for example, a belt saw, a simple cross cutter, or a guillotine after the thermoforming machine. Moreover, it is technically possible to operate the cutting press at a higher cycle rate than the thermoforming machine. This can be done if the forming tool molds simultaneously two or three article series or rows per cycle (multiple mold). In this case, a single-row cutting die is sufficient for the cutting press, which die can sever the thus-formed band. Thereby this cutting die becomes especially inexpensive, and the cutting forces required are not as high as when the entire output must be cut all at once. The cutting press has its own feed or conveyor arrangement for this purpose, conventionally a wiper feed or conveyor for the formed band or sheet.

In the thermoforming machine a spiked sprocket chain has proved to be advantageous for use as the conveying system for the film sheet. Two such chains, which run in respective guide rails, are provided and engage the respective longitudinal edge zones of the sheet. The conveying systems terminates behind the forming station, so that it is possible thereafter to connect any further required machinery, e.g., cutting press, saw, cross cutter, etc.

When linking a thermoforming machine with a separate conveying system of this type to the cutting press with its own wiper type conveyor system, problems are encountered in the case of very high articles, e.g., containers, in the case of articles formed of very thin sheet material, as well as in the case of articles wherein no knobs or protrusions which can be engaged by the wiper can be formed due to the contour of the articles and/or the position of the cutting edge. With very high articles, the wiper cannot be introduced in between the produced articles, since the lifting-off height is insufficient. In the case of articles of a very thin sheet, there is the danger that the wiper dents the sidewalls.

It has been known in these cases merely to push the formed film sheet through the cutting press by means of the conveyor unit of the thermoforming machine and to effect a pull at the waste screen on the opposite side of the cutting press. However, with this arrangement, a high misalignment during the cutting step must be tolerated.

SUMMARY OF THE INVENTION

It is an object of the invention to provide a novel arrangement for linking a thermoforming machine and cutting press, each having a separate feed conveyor, so that it is possible to accurately cut out the articles, e.g., containers and which is also usable in case of high parts and parts formed of a thin sheet, as well as in case of parts which do not permit the integral molding of wiper knobs. In this connection, the heretofore existing possibilities of a rapid dismounting of the cutting press and of combining the thermoforming machine with other units, including the addition of a cutting press with a wiper feed feature, are to be maintained.

The above object has basically and generally been attained according to the invention by providing the cutting press with a conveying means which can be directly connected to the conveyor of the thermoforming machine and runs synchronously therewith. In this way, the transport or conveyance of molded sheet stock is directly taken over by the conveyor of the cutting press and further transported synchronously through the cutting press.

More particularly, the above object is achieved in that the thermoforming machine and the punch press are each provided with a conveying means which includes a sprocket conveyor chain which is mounted for rotation on rotatably mounted sprocket wheels, and means are provided for operatively connecting a sprocket wheel disposed at the output end of the conveying means of the thermoforming machine to a further sprocket wheel disposed at the input end of the conveying means of the cutting press so that the conveying means of the thermoforming machine is drivingly connected to the conveying means of the cutting press.

According to the preferred embodiment, the two sprocket wheels are operatively connected in that each is provided with a set of gear teeth and the two wheels are positioned adjacent one another so that the respective gear teeth mesh. Preferably, the two sprocket wheels are arranged in super position and are appropriately spaced so that while the gear teeth mesh, the edge of the sheet of molded stock material passes between the sprockets.

According to further features of the invention, the number of gear teeth and the number of sprockets on each sprocket wheel is the same; the sprockets and gear teeth are offset by one-half tooth pitch on one of the sprocket wheels while they are being aligned on the other sprocket wheel; and the lower disposed of the two sprocket wheels may be provided with a disk having a diameter such that the disk serves as a support for the molded sheet stock.

DETAILED DESCRIPTION OF THE PREFERRED EMBODIMENTS

Figure 1:
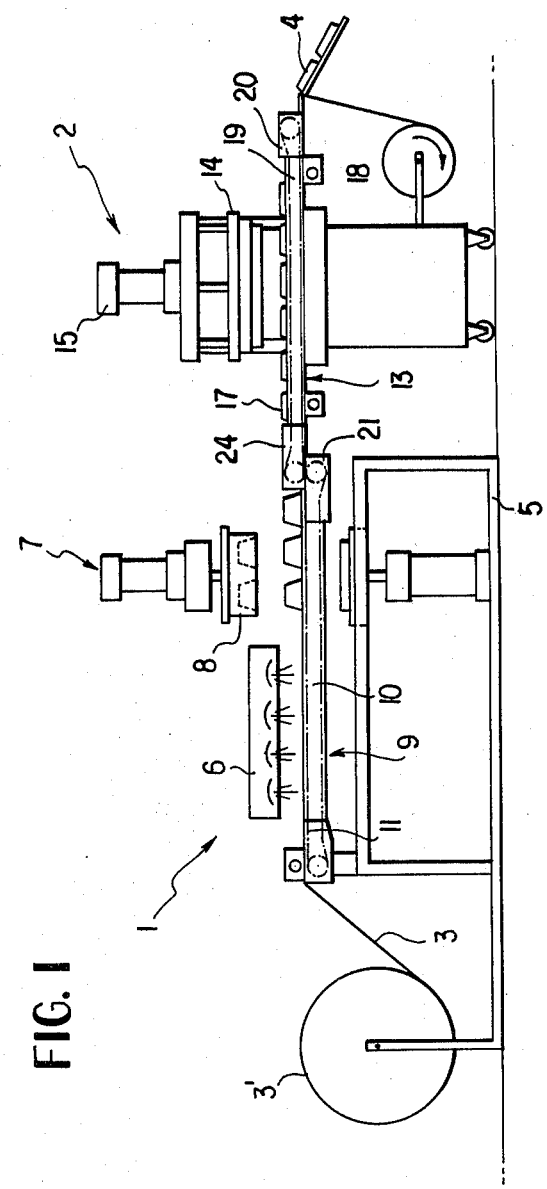
FIG. 1 is a schematic lateral view of a thermoforming machine with a cutting press connected thereafter.

Referring now to FIG. 1, there is shown a thermoforming machine 1 which operates in collaboration with a cutting press 2, so that the articles, e.g. containers, 4 can be prepared from synthetic resin sheet stock material 3 withdrawn from a roll 3' of such material. In this connection, the thermoforming machine 1 generally comprises a frame 5, a heating unit 6 for the stock material, a forming of molding station 7 with a movable top and/or bottom portion containing the actual mold 8 as well as optionally vertically movable clamping frames, and a conveying arrangement 9 for the sheet stock material 3. In a conventional manner, this conveying arrangement includes a pair of guide rails 10 (only one of which is shown) disposed along opposite edges of the frame 5, an actual, revolving conveyor chain 11 associated with each of the guide rails 10, and an intermittent drive, not shown, for the conveyor chains 11. The conveyor chain 11 is guided and supported on rotatably mounted sprocket wheels at the input and output ends of the conveyor 9.

Figure 2:
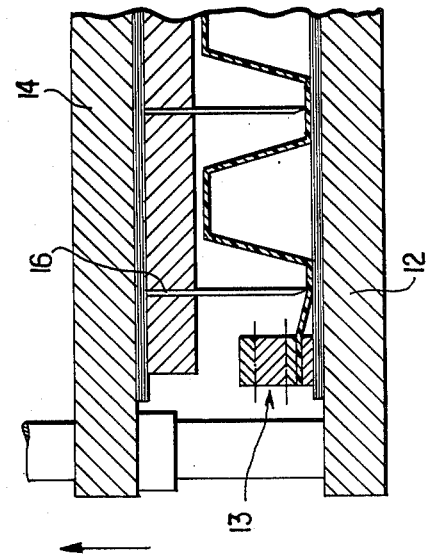
FIG. 2 is a cross section through an area of the cutting press.
Figure 3:
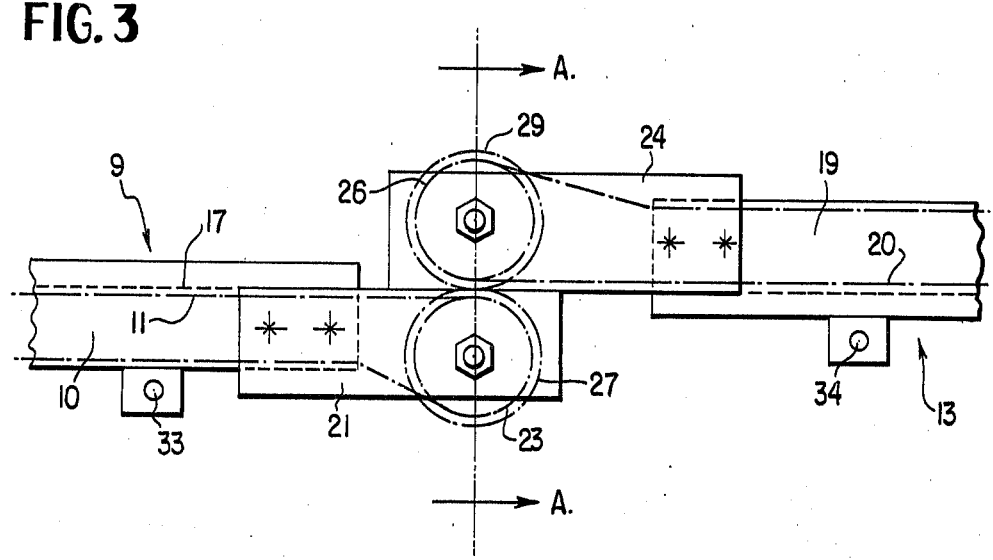
FIG. 3 is an enlarged illustration of the conveyor connection between the thermoforming machine and the cutting press according to the invention.

The thermoforming machine 1 is followed by the cutting press 2 which, for example, as further shown in FIG. 2, has a rigid platen or table 12, a vertically movable top platen 14 acted upon by a drive mechanism 15 and on which is mounted a strip steel die 16, a conveying or feed arrangement 13 for the molded sheet material 17, as well as a waste reel-up arrangement 18.

Figure 4:
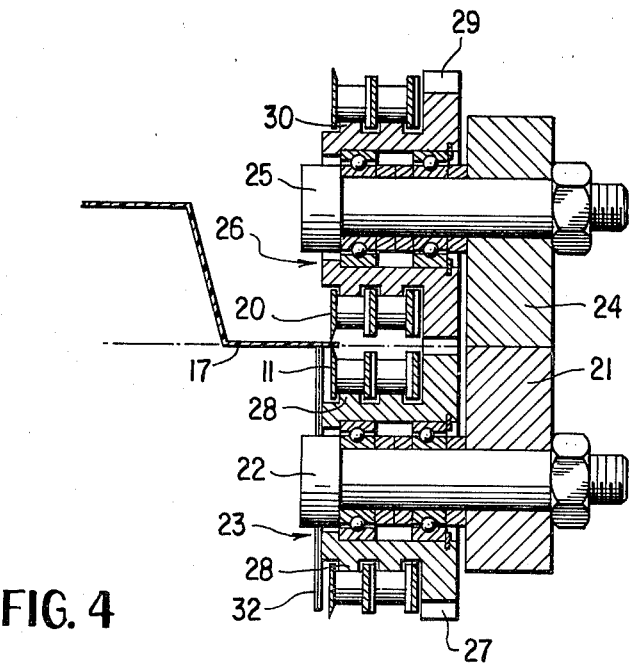
FIG. 4 is a sectional view along line A—A in FIG. 3.
Figure 5:
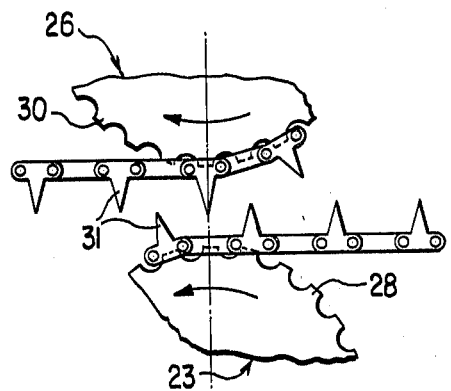
FIG. 5 is a partial side view illustrating the sprocket tooth systems of the sprocket wheels for the respective conveyor chains of the thermoforming machine and the cutting press at the connection point of the two conveyor systems.

According to the invention as illustrated in FIGS. 3-6, an arrangement is provided whereby the conveying means or arrangement 13 of the cutting press, which likewise includes a pair of guide rails 19 (only one of which is shown) and associated revolving conveyor chains 20 guided and supported on sprocket wheels, can be coupled with the sheet conveying arrangement or means 9 of the thermoforming machine 1. For this purpose, a plate 21 is attached to the output end of the guide rail 10 of the thermoforming machine and a sprocket wheel 23 for supporting and guiding the conveyor chain 11 is rotatably mounted on a pin or shaft 22 mounted on the plate 21. In a similar manner, a plate 24 carrying a pin 25 is connected to the input end of guide rail 19 of the cutting press 2 and a sprocket wheel 26 for supporting and guiding the conveyor chain 20 is rotatably supported on the pin 25. As shown in FIG. 5, each of the sprocket wheels is provided with a set of sprockets or teeth 28 and 30 respectively. As further shown in FIG. 5, every other link of each of the chains 11 and 20 is preferably provided with an outwardly directed spiked tongue 31 or 32 respectively for the purpose of engaging the edge of the sheet material to positively convey same.

In addition to sprockets or teeth 28 for engaging the chain 11, the wheel 23 is provided, on a portion of same having a larger diameter than the portion bearing the sprockets 28, with a set of gear teeth 27 with the number of gear teeth 27 being identical with the number of sprockets 28. In a similar manner, the wheel 26 is provided with a set of gear teeth 29 having the same number of teeth as the number of its sprockets 30. It should be noted that in the illustrated embodiment each of the chains 11 and 20 is shown as a double width chain and consequently the wheels 23 and 26 are each provided with two rows of aligned side by side sprockets 28 and 30 respectively. It is to be understood however that for purposes of determining the number of sprockets, each pair of aligned side by side sprockets is considered to be only one sprocket.

Figure 6:
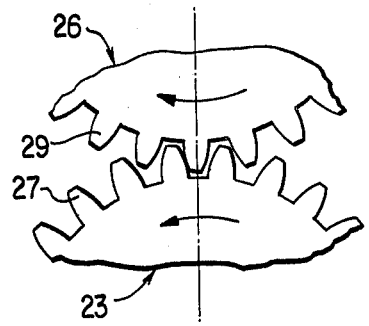
FIG. 6 is a schematic partial side view illustrating the meshing of the gear teeth of the sprocket at the same location as in FIG. 5.
Figure 7:
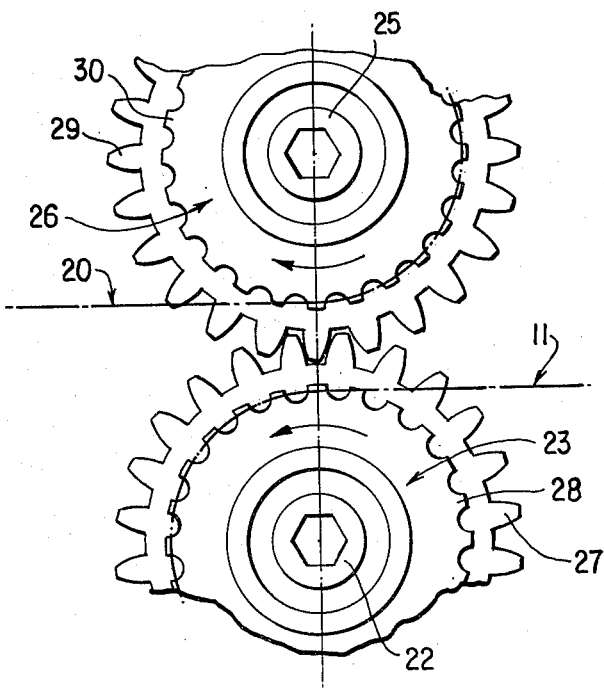
FIG. 7 is a side view of the sprocket wheels and a combination of FIGS. 5 and 6.

While, as described above, the number of sprockets 28 and 30 and the number of gear teeth 27 and 29 are each wheel 23 and 26 respectively is the same, on one of the wheels 23 or 26 the sprockets and gear teeth are arranged so that they are displaced by one-half of the tooth pitch, i.e., so that each sprocket is radially aligned with the groove between two gear teeth, whereas on the other of the wheels 23 or 26 the sprockets and gear teeth are radially aligned. This is shown in FIGS. 5 and 6, which show the relationship of the sprockets 28 and 30 and of the gear teeth 27 and 29 at the same point in time and in FIG. 7.

In order to couple the two conveying means 9 and 13, the plates 21 and 24 are disposed or joined in such a manner that the sprocket wheels 23 and 26 are superimposed, and so that the gear teeth 27 and 29 mesh with one another. As a result of the displacement or offset of the sprockets and gear teeth on one of the sprocket wheels 23 or 26 (the sprocket wheel 23 as shown) and due to the fact that only every second link of the conveyor chains 11 and 20 carries a spiked tongue 31, the spiked tongue 31 of one conveyor chain always extends into the gap between the spiked tongues of the other conveyor chain as shown in FIG. 5. The formed or molded band 17 thus is immediately taken over, upon leaving the sheet transport means 9 of the thermoforming machine, by the conveyor 13 of the cutting press 2 and guided without misalignment to the strip steel die 16.

Preferably, as shown in FIG. 4, a disk 32 is attached to the end of the lower of the two sprocket wheels 23 and 26, the wheel 23 as illustrated. The diameter of this disk 32 is selected such that it contacts the lower surface of the molded sheet 17 and serves as support for the sheet length 17 when the spiked tongues 31 of the conveying means 13 penetrate the molded sheet 17.

Both conveying means 13 and 9 can be adjusted in their widths by way of respective threaded spindles 33 and 34 respectively and thus can be adapted to varying sheet widths.

Due to the described construction according to the invention, it is possible, in a simple manner, to add or dismount the cutting press 2 including the conveying means to or from the thermoforming machine 1 and to reequip the thermoforming machine correspondingly. A separate drive mechanism for the conveyor 13 of the cutting press 2 is unnecessary. In this way, it is also possible to subsequently supply an existing thermoforming machine with such a conveyor-equipped cutting press, without requiring extensive reconstruction of the thermoforming machine.

Due to the feature that the spiked tongues 31 extend upwardly during the conveying operation in the thermoforming machine 1, but project downwardly during the conveying operation in the cutting press 2, format-adapting sub or understructures to accomodate varying sheet widths are not required when changes are made in the zone of the strip steel die. This has proven to be advantageous in this type of transfer.

It is to be understood that the above description of the present invention is susceptible to various modifications, changes and adaptations, and the same are intended to be comprehended within the meaning and range of equivalents of the appended claims.

What is claimed is:

1. In an apparatus for the molding of thermoplastic synthetic resin sheet stock into articles and for punching these articles from the sheet length, said apparatus including a thermoforming machine having a heating unit for the sheet stock, a forming station, and a sheet conveying means with an intermittent drive, and the cutting press disposed immediately after said thermoforming machine and having a vertically movable top platen with a cutting die, a rigid table, and a separate sheet conveying means for conveying the formed sheet material across said table; the improvement wherein each of said conveying means includes a substantially horizontal sprocket conveyor chain guided for rotation on rotatably mounted sprocket wheels, and means are provided for operatively connecting a first of said sprocket wheels disposed at the output end of said conveying means of said thermoforming machine to a second of said sprocket wheels disposed at the input end of said conveying means of said cutting press so that said conveying means of said thermoforming machine is drivingly connected to said conveying means of said cutting press.

2. Apparatus as defined in claim 1 wherein said means for operationally connecting comprises a set of gear teeth on each said first and second sprocket wheel, and means for mounting said first and second wheels adjacent one another so that said sets of gear teeth mesh.

3. Apparatus as defined in claim 2 wherein the diameter of the portion of each said sprocket wheel containing said gear teeth is greater than the diameter of the portion containing the sprockets; and wherein said first and second sprocket wheels are arranged in superposition and are appropriately spaced so that one edge of the sheet of molded stock material passes between said portions containing said sprockets.

4. Apparatus as defined in claim 3, wherein the number of gear teeth and of the number of sprockets on each of said first and second sprocket wheels is the same.

5. Apparatus as defined in claim 4, wherein said sprockets and said gear teeth are in mutual alignment on one of said first and second sprocket wheels and are displaced by one-half tooth pitch on the other of said first and second sprocket wheels.

6. Apparatus as defined in claim 5 wherein every other link of each of said sprocket chains is provided with an outwardly extending spiked tongue; and wherein the vertical spacing between the sprockets of said first and second sprocket wheels is such that said tongues of one said sprocket chain will extend between said tongues of the other said sprocket chains.

7. Apparatus as defined in claim 1, 3, or 5, further comprising a disk mounted on the one of said first and second sprocket wheels which is disposed below the conveying plane of the molded sheet stock, said disk having a diameter such that it serves as a support for the molded sheet stock.

* * * * *